US005566675A

United States Patent [19]
Li et al.

[11] Patent Number: 5,566,675
[45] Date of Patent: Oct. 22, 1996

[54] BEAMFORMER FOR PHASE ABERRATION CORRECTION

[75] Inventors: Ming Li, Seattle; Levin Nock, Issaquah, both of Wash.

[73] Assignee: Siemens Medical Systems, Inc., Iselin, N.J.

[21] Appl. No.: 497,176

[22] Filed: Jun. 30, 1995

[51] Int. Cl.$^6$ .................................................. A61B 8/00
[52] U.S. Cl. ..................................................... 128/661.01
[58] Field of Search ........................ 128/660.06, 660.07, 128/660.08, 661.01; 73/625, 626; 364/413.25; 367/103, 105

[56] References Cited

U.S. PATENT DOCUMENTS

| | | |
|---|---|---|
| 4,817,614 | 4/1989 | Hassler et al. . |
| 5,172,343 | 12/1992 | O'Donnell . |
| 5,229,933 | 7/1993 | Larson, III . |
| 5,388,079 | 2/1995 | Kim et al. ........................ 128/661.01 |
| 5,469,851 | 11/1995 | Lipschutz ........................ 128/661.01 |
| 5,476,098 | 12/1995 | O'Donnell ........................ 128/661.01 |

OTHER PUBLICATIONS

A Parallel Processing System for Real–Time Phase Aberration Correction Using an Improved Phase Extraction Technique, by Paul D. Freiburger et al., Duke University, IEEE–UFFC Conference 1993, pp. 1–4.

An Evaluation of Transducer Design and Algorithm Performance for Two Dimensional Phase Aberration Correction, by Gregg E. Trahey et al., Duke University, IEEE, 1991 Ultrasonics Symposium, pp. 1181–1187.

Aberration Correction on a Two–Dimensional Anisotropic Phased Array, by M. O'Donnell et al., University of Michigan, IEEE, 1991 Ultrasonics Symposium, pp. 1189–1193.

Correlation–Based Aberration Correction in the Presence of Inoperable Elements, by Matthew O'Donnell et al., IEEE Transactions On Ultrasonics, Ferrelectrics, and Frequency Control, vol. 39, No. 6, Nov. 1992, pp. 700–707.

Primary Examiner—George Manuel

[57] ABSTRACT

An ultrasonic imaging system is provided that effectively corrects for inhomogeneities in the imaged media. The ultrasonic imaging system comprises a transducer array having a plurality of transducer elements each being separately operable to provide an ultrasonic pulse in response to a driving signal and to provide a corresponding echo signal in response to a received echo based on the ultrasonic pulse. A transmitter is coupled to the transducer array and provides the driving signal to each respective one of the transducer elements. The driving signals define a steered beam of the transducer array. A receiver is coupled to the transducer array and receives the echo signal from each respective one of the transducer elements. The receiver includes a beamformer section that produces a single matched and summed signal from the echo signals of the plurality of transducer elements. The beamformer section comprises a plurality of processing modules coupled in a cascading arrangement with separate processing stages.

22 Claims, 2 Drawing Sheets

COHERENT SIGNAL SUM

BEAMFORMER FOR PHASE ABERRATION CORRECTION

BACKGROUND OF THE INVENTION

1. Field of the Invention

This invention relates to ultrasonic diagnostic imaging, and more particularly, to an imaging system beamformer having a cascade structure that provides improved phase aberration delay correction.

2. Description of Related Art

Ultrasonic imaging techniques are commonly used to produce two-dimensional diagnostic images of internal features of an object, such as a human anatomy. A diagnostic ultrasonic imaging system for medical use forms images of internal tissues of a human body by electrically exciting an acoustic transducer element or an array of acoustic transducer elements to generate short ultrasonic pulses that travel into the body. The ultrasonic pulses produce echoes as they reflect off of body tissues that appear as discontinuities or impedance changes to the propagating ultrasonic pulses. These echoes return to the transducer, and are converted back into electrical signals that are amplified and decoded to produce a cross-sectional image of the tissues. These ultrasonic imaging systems are of significant importance to the medical field by providing physicians with real-time, high resolution images of the internal features of a human anatomy without resort to more invasive exploratory techniques, such as surgery.

The acoustic transducer which radiates the ultrasonic pulses typically comprises a piezoelectric element or matrix of piezoelectric elements. As known in the art, a piezoelectric element deforms upon application of an electrical signal to produce the ultrasonic pulses. In a similar manner, the received echoes cause the piezoelectric element to deform and generate the corresponding electrical signal. The acoustic transducer is often packaged within a handheld device that allows the physician substantial freedom to manipulate the transducer easily over a desired area of interest. The transducer can then be electrically connected via a cable to a central control device that generates and processes the electrical signals. In turn, the control device transmits the image information to a real-time viewing device, such as a video display terminal (VDT). The image information may also be stored to enable other physicians to view the diagnostic images at a later date.

In one particular method of ultrasonic imaging, referred to as Phased Array Sector Scanning (PASS), the transducer comprises an array of piezoelectric elements that are individually driven by separate electrical signals. By controlling the phase and amplitude of the signals, the ultrasonic wave produced by the piezoelectric elements can be focused, or steered, to a single point. The received echoes from the individual ultrasonic waves are then summed together and processed in a manner that yields a net signal characterizing the single point, a process referred to as beamforming. The imaging operation can be repeated to collect information from a series of points along a scan line. A plurality of such scan lines would provide a sector scan of an entire region of interest.

An important assumption of the beamforming process is that the acoustic velocity within the human tissues is a constant (generally a value of 1,540 meters per second (m/s) is used). In reality, however, the acoustic velocity varies substantially since the human body is composed of inhomogenous layers of different tissue types, such as subcutaneous fat, muscle and bone. Moreover, the tissue boundaries are substantially non-uniform, having ridges and bumps of varying thicknesses, densities, and acoustic velocities. For example, the propagation velocity of an ultrasonic wave varies from approximately 1,470 m/s in fat, to greater than 1,600 m/s in muscle and nervous tissue, to as much as 3,700 m/s in bone. These aberrations in the tissues slow down or speed up the acoustic waves emanating from certain elements in the transducer array such that the signals corresponding to the delayed waves do not have the desired phase when summed with the other signals during beamforming. As a result of this phase aberration, various types of ultrasound image anomalies can be experienced, including image artifacts, range shifts, geometric distortions, broadening of the transducer beam pattern which degrades lateral resolution, and increased side lobes which reduce the contrast resolution of the image. These various anomaly types tend to be especially prevalent and degrading in certain tissue imaging operations in which a relatively large degree of inhomogeneities exist, such as abdominal, transcranial and breast imaging.

Various methods have been proposed to correct for the undesirable phase aberration. One such method is disclosed in U.S. Pat. No. 5,172,343, to O'Donnell for ABERRATION CORRECTION USING BEAM DATA FROM A PHASED ARRAY ULTRASONIC SCANNER. O'Donnell discloses a system for phase aberration correction in which the phase delay error between each transducer element and the nearest adjacent transducer element is estimated by cross-correlating the signals from these two elements. A correction delay is supplied to each particular element based on a sum total of all the estimated delays between that element and a reference element (such as the first element of the array).

A significant drawback of the O'Donnell system is that dead or weak transducer elements tend to degrade performance of the entire system, since errors in phase estimation are accumulated across all the elements of the array. This accumulation of errors ultimately causes inaccuracies in the signal phase profile. It is possible to detect the dead or weak elements and remove their deleterious effects, or to mitigate the overall accumulation of errors by iteratively defining the phase profile over several consecutive pulse repetitions. Nevertheless, these corrective measures substantially increase the magnitude of signal processing with a resulting decrease in imaging speed.

Another phase aberration correction system is disclosed in U.S. Pat. No. 5,331,964, to Trahey et al. for ULTRASONIC PHASED ARRAY IMAGING SYSTEM WITH HIGH SPEED ADAPTIVE PROCESSING USING SELECTED ELEMENTS. Trahey discloses a system in which the phase error of a particular element (or group of elements) is estimated by maximizing the brightness of a signal formed by adding the signal from this element to a signal from a reference element (or group of elements). While this technique tends to be more robust in terms of differentiating noise and weak signals, it requires a complex and thus expensive parallel implementation in order to provide commercially acceptable imaging speed. Also, this technique requires that some acoustic signals be used to measure the phase aberration, and other acoustic signals be used to form the image, which tends to decrease the imaging speed.

Accordingly, a critical need exists for a phase aberration correction method and apparatus for use with an ultrasonic phased array sector scanning system that is capable of overcoming these deficiencies of the prior art. Specifically, such a phase aberration correction method and apparatus should be able to limit the accumulative effect of localized defects or errors within the transducer array, and should be capable of parallel implementation with minimal complexity or impact upon imaging speed.

SUMMARY OF THE INVENTION

In accordance with the teachings of this invention, an ultrasonic imaging system is provided that effectively corrects for phased array sector scanning phase aberrations due to imaging through inhomogeneous tissue layers.

The ultrasonic imaging system comprises a transducer array having a plurality of transducer elements each being separately operable to provide an ultrasonic pulse in response to a driving signal and to provide a corresponding echo signal in response to a received echo based on the ultrasonic pulse. A transmitter is coupled to the transducer array and provides the driving signal to each respective one of the transducer elements. The driving signals define a steered beam of the transducer array. A receiver is coupled to the transducer array and receives the echo signal from each respective one of the transducer elements. The receiver includes a beamformer section that produces a single matched and summed signal from the echo signals of the plurality of transducer elements.

More particularly, the beamformer section comprises a plurality of separate processing modules coupled in a cascading arrangement within separate processing stages. A first processing stage receives input signals that comprise the echo signals from the transducer elements and at least one subsequent stage receives input signals that comprise matched and summed signals from the processing modules of a previous stage. The processing modules each set the phase of all input signals equal. The input signals with matching phase are then coherently summed to provide a local matched and summed signal. The local matched and summed signals from a plurality of processing modules of the first processing stage are processed by processing modules of subsequent processing stages. Phase matching may be accomplished using adaptively controlled delays or filters, controlled by the output of a cross-correlation, CORDIC, or minimum sum-absolute-difference (MSAD) processor.

DETAILED DESCRIPTION OF THE PREFERRED EMBODIMENT

This invention satisfies the critical need for a phase aberration correction method and apparatus for use with an ultrasonic phased array sector scanning system. The phase aberration correction method and apparatus limits the accumulative effect of localized defects or errors within the transducer array, and permits parallel implementation with minimal complexity or impact upon imaging speed. In the detailed description that follows, like element numerals are used to describe like elements of one or more of the figures.

Figure 1:
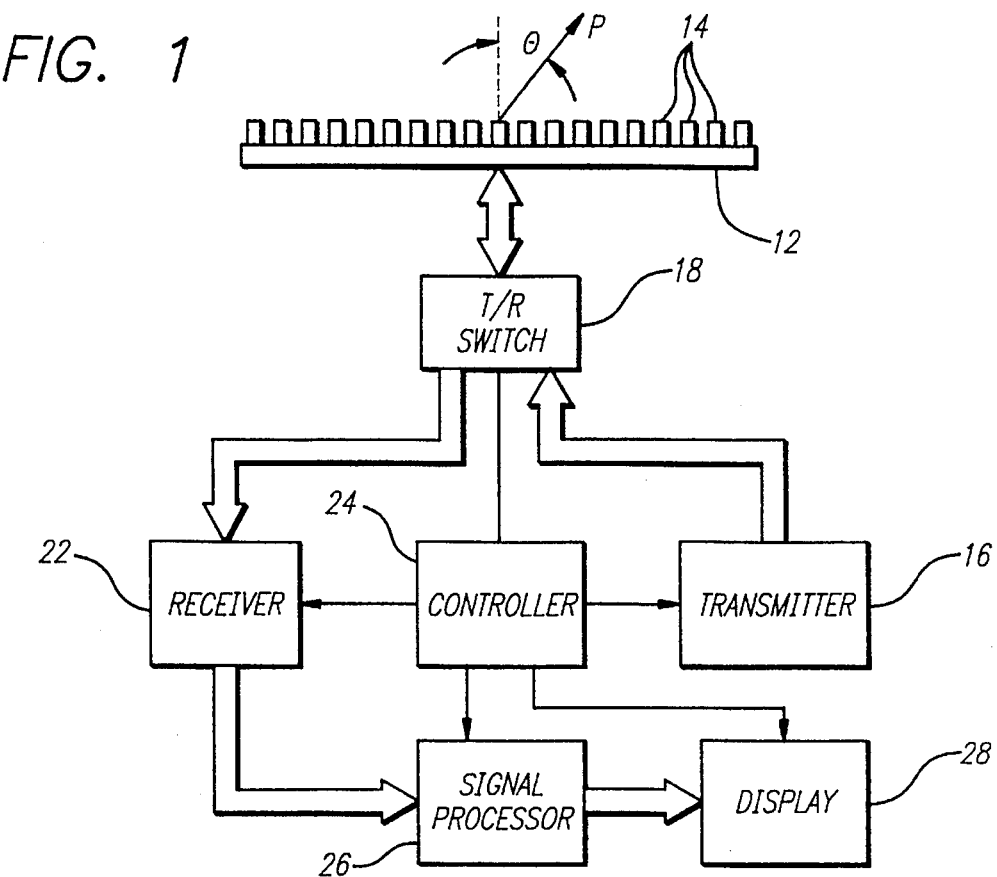
FIG. 1 is a block diagram of an ultrasonic imaging system having the beamformer for phase aberration correction of this invention.

Referring first to FIG. 1, a block diagram of an exemplary ultrasonic imaging system is provided. The ultrasonic imaging system includes a transducer array 12 comprised of a plurality of separately driven transducer elements 14. The transducer array 12 may comprise either a one-dimensional array having a plurality of linearly disposed transducer elements 14, or a two-dimensional array in which the transducer elements are disposed in a matrix. In either configuration, the transducer elements 14 produce acoustic pulses when energized by an electrical signal provided by a transmitter 16. The acoustic pulses travel through the various tissue layers of the patient, and are then reflected back from a region of interest to the transducer elements 14 in the form of echo return pulses. The echo return pulses are converted by the transducer elements 14 back into electrical signals that are routed to a receiver 22. A transmit/receive switch 18 controls the flow of signals from the transmitter 16 to the transducer array 12, and from the transducer array to the receiver 22. The transmitter 16, receiver 22 and transmit/receive switch 18 are operated under the control of a central controller 24 that is responsive to commands by an operator of the ultrasonic imaging system.

A phased array sector scan is performed by controlling the phase of the signals applied by the transmitter 16 to each of the elements of the transducer array 12. By imparting a time delay to the electrical signal pulses provided to the successive transducer elements 14, the signal pulses cumulatively provide a net ultrasonic beam directed at an angle θ relative to a plane of the transducer array 12 toward a desired focal point P. Progressive changes to the extent of the relative time delays causes the angle θ to change incrementally, thus steering the ultrasonic beam in a desired direction along a scan line.

The echo return pulses from the focal point P differ in phase and amplitude due to the differences in the propagation path travelled by the respective acoustic pulses. The receiver 22 amplifies and demodulates the echo signals, imparts an appropriate time delay to each one of the echo signals, and sums the delayed echo signals together to provide a single beamformed signal that indicates the total ultrasonic energy reflected from the focal point P. The receiver 22 typically includes an analog-to-digital converter that converts each of the analog echo signals into a series of digital values that can be sampled at a predetermined rate. The beamformed signal is then provided to the signal processor 26, where it is combined with like beamformed signals from other focal points of the scan lines to assemble a complete sector scan image. Finally, the signal processor 26 converts the plurality of beamformed signals into a data format that can be displayed as a graphical image on the video display terminal 28. The graphical image data may also be stored for later viewing, or printed to a hard-copy image.

Figure 2:
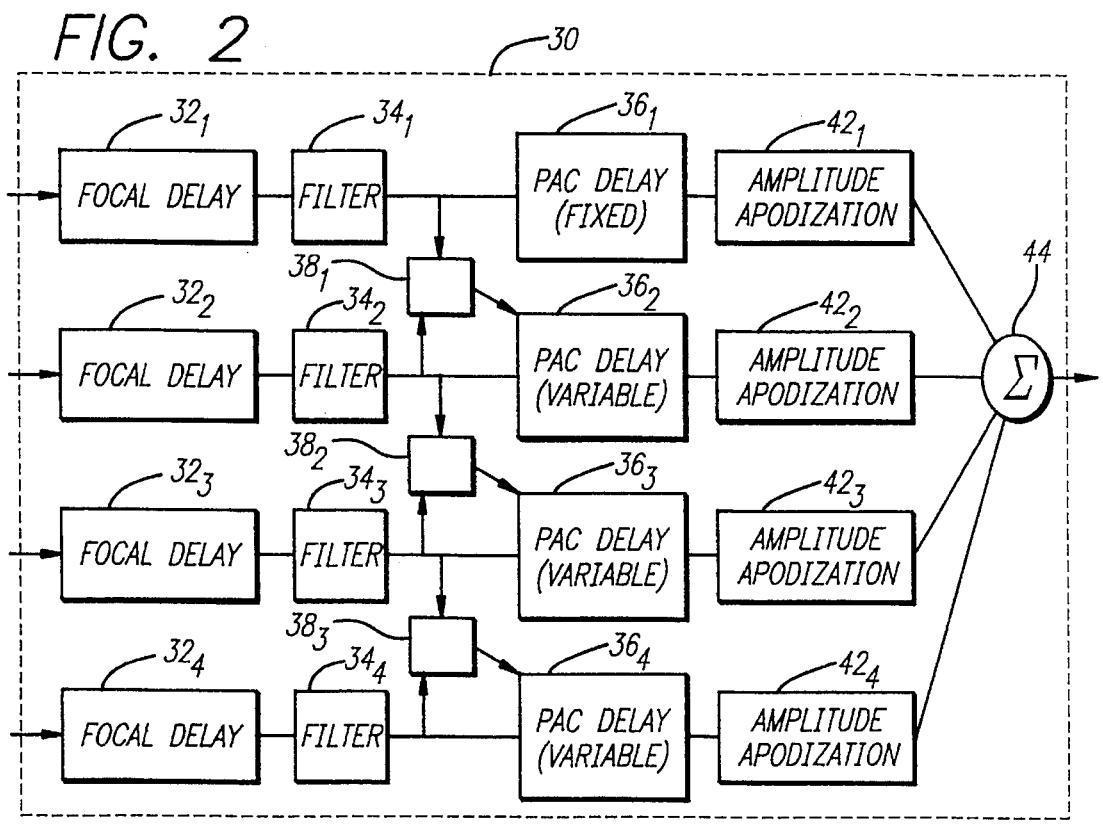
FIG. 2 is a block diagram of a beamformer processing module within a receiver of the ultrasonic imaging system.
Figure 3:
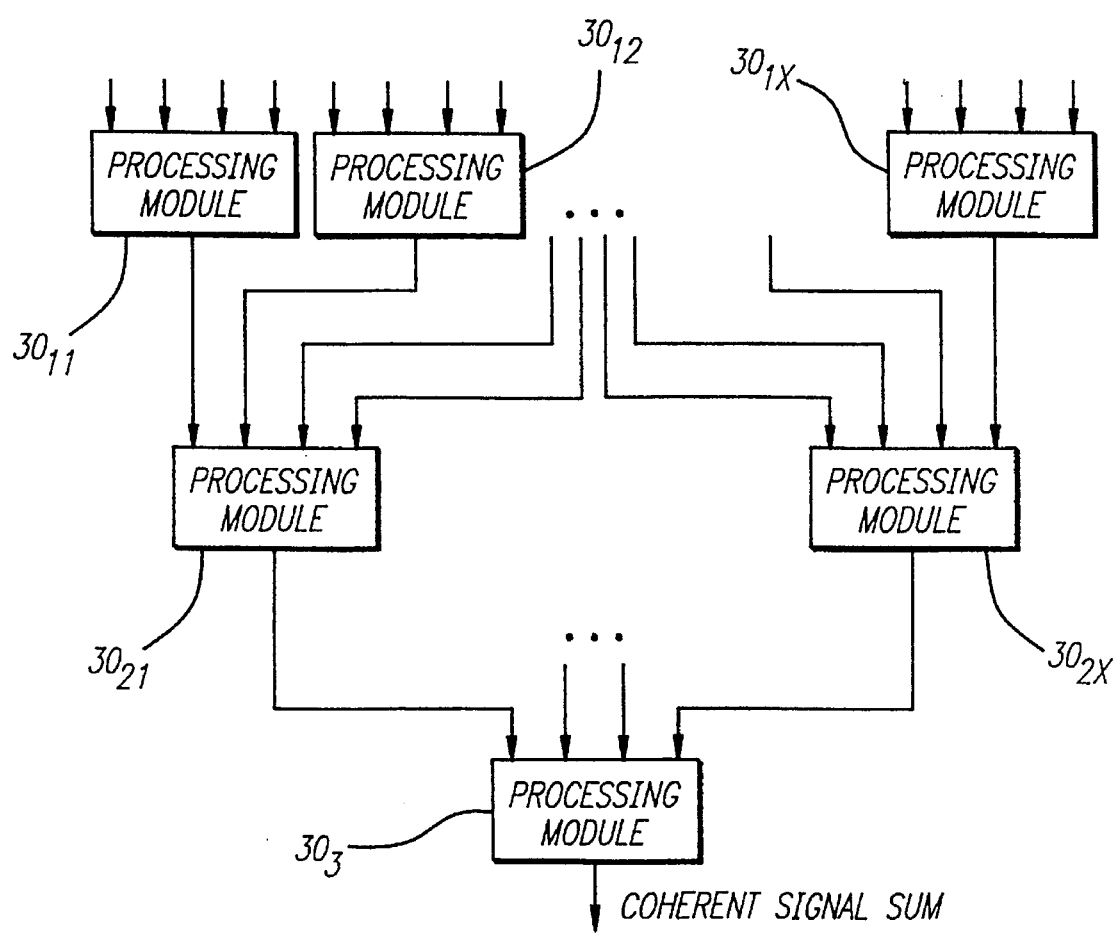
FIG. 3 is a block diagram of a plurality of beamformer processing modules coupled in a cascading arrangement.

The beamformer section of the receiver 22 is illustrated in greater detail within FIGS. 2 and 3. FIG. 2 illustrates a single processing module 30 for converting a plurality of digital sample values of the echo signals from the transducer array 12 into a single beamformed signal. The processing module 30 includes focal delay units $32_{1-4}$, filters $34_{1-4}$, phase aberration correction (PAC) delay units $36_{1-4}$, and amplitude apodization units $42_{1-4}$, arranged in substantially parallel processing streams. In the module 30 of FIG. 2, there are four identical signal streams, though it should be appreciated that any number of streams could be selected. As will be understood from the following description, it is advantageous to limit the number of signal streams within a single processing module in order to minimize the effect of invalid data on any one of the signal streams with respect to the ultimate beamformed signal.

The delay units $32_{1-4}$ apply a pre-determined delay to the incoming digital samples for the purpose of focussing the echo signals. The magnitudes of the respective delays are equal and opposite to the time delays initially provided to signals applied to the transducer elements 14 by the transmitter 16. A conventional FIFO (first in-first out) device can be used to provide the delay units $32_{1-4}$. As known in the art, a FIFO is a semiconductor memory device into which a digital value is successively written to and then read out. The amount of delay applied by the FIFO unit is determined by the difference between the memory location from which the digital sample is currently being supplied and the memory location into which the currently received digital sample is being stored. The associated time delays are multiples of the time intervals between successive ones of the digital samples, and the actual time delay will depend on the digital sampling rate.

Since the delayed digital sample values also contain some degree of high frequency noise, it is desirable to remove the high frequency content before the signals are processed further. The filters $34_{1-4}$ comprise finite impulse response (FIR) filters, or low-pass filters, that are tuned to pass the difference frequencies supplied by the delay units $32_{1-4}$ while blocking the higher frequencies. Various types of conventional FIR filters can be advantageously utilized as the filters $34_{1-4}$, e.g., smoothed filters, Hannan-Thomas filters, etc.

After filtering, the digital samples on adjacent ones of each signal stream are compared by the signal distortion estimator units $38_{1-3}$ to estimate the magnitude of relative time delay shift caused by the tissue inhomogeneities. Specifically, the signal distortion estimator units $38_{1-3}$ perform phase difference estimation between the two signal streams. The signal distortion estimator units $38_{1-3}$ may each comprise a sum-absolute-difference (SAD) algorithm. The SAD is the sum of absolute differences between corresponding digital sample values on adjacent ones of the signal streams. The "best match" between the digital samples occurs where the SAD value is at a minimum. The SAD technique is used to derive an estimation of the time differential between the signal streams, which is provided to the PAC delay units $36_{2-4}$.

The PAC delay units $36_{1-4}$ are similar in construction to the delay units $32_{1-4}$, and are comprised of conventional FIFO devices. The PAC delay unit $36_1$ supplies a delay time of fixed duration. The PAC delay units $36_{2-3}$ supply a fixed delay to compensate for the output latency of the signal distortion estimator units $38_{1-3}$, plus a variable delay dependent upon the time delay determination of the signal distortion estimator units $38_{1-3}$. The variable delay comprises the inverse of the phase difference estimated by the signal distortion estimator units $38_{1-3}$ described above. Following this operation, the phase difference between the adjacent signal streams is zero. Generally, the time delays provided by the PAC delay units $36_{1-4}$ compensate for the delay errors in the respective signal streams caused by the tissue inhomogeneities, and permits the delayed signal streams to be coherently summed.

The final step within the processing module 30 is performed by the amplitude apodization units $42_{1-4}$. Amplitude apodization refers to multiplying each signal stream by a constant value, in order to reduce undesirable sidelobes in the beamformed signal. Signals near the center of the transducer array are multiplied by larger values, and signals near the edges of the array are multiplied by smaller values, as is well known in the art. The amplitude apodization values are calculated based on an assumption that all received signals have an equal average value. Because of tissue inhomogeneities, some signals may actually have larger average values than others. Adaptive amplitude apodization may be applied in order to equalize the average values. The signal distortion estimator units $38_{1-3}$ would be used to adaptively modify the amplitude apodization at each element. The total amplitude apodization, or multiplier value, at each element will then be the product of an adaptive part (to set the average values of all signals equal) and a precalculated part (to reduce sidelobes in the beamformed signal). After apodizing, the digital samples are coherently summed by a summing unit 44 to provide a single matched and summed output signal.

Referring now to FIG. 3, a plurality of processing modules 30 are coupled together in a cascading structure. The cascading structure comprises a plurality of distinct processing stages. A first processing stage includes processing modules $30_{11-1x}$ that receive the digital sample values originating from each of the transducer elements 14. Each one of the first stage processing modules $30_{11-1x}$ generates an output signal that represents a coherent signal sum of the respective input values. The output signals of the first stage processing modules $30_{11-1x}$ are in turn provided to a second stage containing processing modules $30_{21-2x}$. In similar fashion, the output signals of the second stage processing modules $30_{21-2x}$ are provided to a third stage containing a single processing module $30_3$. The final output of the third stage processing module $30_3$ comprises the coherent signal sum of all previous matched and summed signals, and is the final beamformed signal representative of the total ultrasonic energy reflected from the focal point P.

This final beamformed output is provided to the signal processor 26 of FIG. 1 for processing into the graphical image data. The signal processor 26 may further utilize the estimated delay information to construct a delay profile that characterizes the particular tissue layers under examination. The delay profile could then be utilized to correct the transmit delay times applied by the transmitter 16 prior to firing the next round of pulses. Thus, the phase aberration correction system described above can be used in both transmit and receive modes.

The use of a cascading structure provides certain distinct advantages over the prior art systems. Most notably, local errors in the phase aberration delay estimation are not accumulated across the entire array, thus a local error in delay estimation cannot have a large effect on the focusing of the entire array. While an erroneous estimation between any two inputs to a processing module will degrade the output of that particular module, it will not degrade the output signals from any other modules within the same processing stage. Any such errors are most likely to occur in the first stage of processing since its signal-to-noise ratio is lower than that of the subsequent stages. In the subsequent stages, the impact of an error on the final image would be larger; however, the probability of such an error is lower since the signal-to-noise ratio is higher at these stages.

It should be apparent that the particular embodiment of the processing modules 30 and cascading structure of FIG. 3 is for exemplary purposes only. The actual number of inputs to each processing module and the total number of processing stages can be selected to achieve the most effective balance between the processing speed, accuracy, robustness against noise, and cost. Moreover, the processing modules in the different ranks could have differing numbers of inputs. For example, it may be desirable to have a greater number of inputs, such as ten, in the final processing module $30_3$ in order to improve speckle correlation. As known in the art, the received speckle signals at two receive elements tend to decorrelate in proportion to the distance between the elements.

In an embodiment of this invention, all acoustic transmit pulses are used to form an image. The same pulses are also used, simultaneously, to estimate the tissue aberration, and this estimation is taken into account when the image is formed. No pulses are dedicated to measurement of the tissue aberration, so this correction technique will not reduce the imaging rate of the scanner.

In another embodiment, some acoustic transmit pulses are used to estimate the tissue aberration, and other pulses are used to form an image. This allows the adaptive phase delays and amplitude apodization to be processed centrally in order to remove artifacts such as steering components, and in order to impose continuity on adjacent beams in the image. Further, this allows the same corrections to be applied in transmit and receive modes. These enhancements will make the algorithm more robust. The disadvantage of this embodiment is that the imaging rate of the scanner will be reduced, and the hardware will be more complex in order to support centralized control over the correction.

The above method and apparatus for phase aberration correction is applicable to both real-time imaging and off-line imaging with recorded image information. It should also be apparent that the method and apparatus of this application are not limited to processing of ultrasonic images, but would be equally applicable to other PASS imaging modalities, such as radar or sonar imaging.

What is claimed is:

1. A method of correcting for aberrations in transmission media within an ultrasonic imaging system utilizing an ultrasonic transducer array having a plurality of transducer elements, comprising the steps of:

receiving a set of input signals comprising phased array echo signals corresponding to a region of interest within said transmission media from the ultrasonic transducer array wherein each one of said set of phased array echo signals corresponds to one of said plurality of transducer elements;

dividing the set of input signals into a plurality of distinct processing groups within a parallel processing stage;

estimating difference in phase between adjacent ones of the input signals within each respective one of the processing groups;

matching the input signals based on the estimated difference in phase between the adjacent ones of the input signals;

summing the associated matched input signals to form a corrected beam signal from each respective one of the processing groups; and repeating sequentially said dividing, estimating, matching, and summing steps utilizing the corrected beam signals as the input signals in at least one subsequent parallel processing stage until a single corrected beam signal remains.

2. The method of claim 1, wherein said estimating step further comprises cross-correlating said adjacent ones of the input signals.

3. The method of claim 1, wherein said matching step further comprises adding a variable delay to selective ones of the input signals following said estimating step.

4. The method of claim 3, further comprising the step of apodizing amplitude of the input signals following the step of adding a variable delay.

5. The method of claim 4, wherein said apodizing step further comprises applying a fixed apodization plus an adaptive apodization based on said estimated phase difference.

6. The method of claim 1, further comprising the step of correcting selective ones of the input signals by adding a predetermined focal delay prior to said estimating step.

7. The method of claim 6, further comprising the step of low pass filtering the input signals following the correcting step.

8. The method of claim 1, wherein the repeating step is repeated for at least two subsequent parallel processing stages.

9. An imaging system, comprising:

a transducer array having a plurality of transducer elements each being separately operable to provide a pulse in response to a driving signal and to provide a corresponding return signal in response thereto;

a transmitter coupled to said transducer array and being operable to provide said driving signal to each respective one of said transducer elements, the driving signals defining a steered beam of said transducer array; and a receiver coupled to said transducer array and being operable to receive said return signal from each respective one of the transducer elements, said receiver including means for forming a single summed signal from the return signals of the plurality of transducer elements, said forming means comprising a plurality of processing modules coupled in a cascading arrangement having separate stages wherein a first stage receives input signals comprising said return signals and at least one subsequent stage receives input signals comprising summed signals from said processing modules of a previous stage, each said processing module further comprising means for correcting for phase aberration between adjacent ones of said input signals.

10. An imaging system, comprising:

a transducer array having a plurality of transducer elements each being separately operable to provide a pulse in response to a driving signal and to provide a corresponding return signal in response thereto;

a transmitter coupled to said transducer array and being operable to provide said driving signal to each respective one of said transducer elements, the driving signals defining a steered beam of said transducer array; and a receiver coupled to said transducer array and being operable to receive said return signal from each respective one of the transducer elements, said receiver including means for forming a single summed signal from the return signals of the plurality of transducer elements, said forming means comprising a plurality of processing modules coupled in a cascading arrangement having separate stages wherein a first stage receives input signals comprising said return signals and at least one subsequent stage receives input signals comprising summed signals from said processing modules of a previous stage, wherein said processing modules each further comprises means for estimating phase difference between adjacent ones of the input signals.

11. The ultrasonic imaging system of claim 10, further comprising means for delaying selective ones of the input signals in accordance with said estimated phase difference.

12. The ultrasonic imaging system of claim 11, further comprising means for summing the selectively delayed input signals.

13. An ultrasonic imaging system, comprising:

a transducer array having a plurality of transducer elements each being separately operable to provide an ultrasonic pulse in response to a driving signal and to provide a corresponding echo signal in response to a received echo based on the ultrasonic pulse;

a transmitter coupled to said transducer array and being operable to provide said driving signal to each respective one of said transducer elements, the driving signals defining a steered beam of said transducer array; and a receiver coupled to said transducer array and being operable to receive said echo signal from each respective one of the transducer elements, said receiver including means for forming a single summed signal from the echo signals of the plurality of transducer elements, said forming means comprising a plurality of processing modules coupled in a cascading arrangement having separate stages such that a first stage receives input signals comprising said echo signals and at least one subsequent stage receives input signals comprising summed signals from said processing modules of a previous stage, each said processing module further comprising means for correcting for phase aberration between adjacent ones of said input signals.

14. The ultrasonic imaging system of claim 13, wherein said processing modules each further comprises means for phase matching adjacent ones of the input signals.

15. The ultrasonic imaging system of claim 14, wherein said processing modules each further comprise means for summing the phase matched input signals.

16. The ultrasonic imaging system of claim 14, wherein said phase matching means further comprises means for delaying selective ones of the input signals.

17. The ultrasonic imaging system of claim 14, wherein said phase matching means further comprises means for apodizing amplitude of the phase matched input signals.

18. The ultrasonic imaging system of claim 17, wherein said apodizing means further comprises a fixed apodization plus an adaptive apodization based on said estimated phase difference.

19. The ultrasonic imaging system of claim 17, wherein said phase matching means further comprises means for controlling extent of said amplitude apodization.

20. The ultrasonic imaging system of claim 13, wherein said processing modules each further comprises means for selectively adding a predetermined focal delay to said input signals.

21. The ultrasonic imaging system of claim 13, wherein said processing modules each further comprises means for filtering said input signals.

22. The ultrasonic imaging system of claim 13, wherein there are at least three of said processing stages.

* * * * *